United States Patent
Ophir

(10) Patent No.: US 9,730,095 B2
(45) Date of Patent: Aug. 8, 2017

(54) SYSTEM AND METHOD FOR REDUCING MOBILE NETWORK SIGNALING

(71) Applicant: StarHome Mach GmbH, Zurich (CH)

(72) Inventor: Shai Ophir, Moshav Ein-Vered (IL)

(73) Assignee: StarHome Mach GmbH, Zurich (CH)

( * ) Notice: Subject to any disclaimer, the term of this patent is extended or adjusted under 35 U.S.C. 154(b) by 136 days.

(21) Appl. No.: 14/754,986

(22) Filed: Jun. 30, 2015

(65) Prior Publication Data

US 2015/0382241 A1 Dec. 31, 2015

Related U.S. Application Data

(60) Provisional application No. 62/018,703, filed on Jun. 30, 2014.

(51) Int. Cl.
*H04W 4/00* (2009.01)
*H04W 24/08* (2009.01)
*H04W 8/18* (2009.01)
*H04L 29/08* (2006.01)
*H04L 1/00* (2006.01)

(52) U.S. Cl.
CPC .............. *H04W 24/08* (2013.01); *H04L 67/18* (2013.01); *H04L 67/306* (2013.01); *H04W 8/18* (2013.01); *H04L 1/0029* (2013.01)

(58) Field of Classification Search
CPC ........ H04W 24/08; H04W 8/18; H04L 67/18; H04L 67/306; H04L 1/0029
See application file for complete search history.

(56) References Cited

U.S. PATENT DOCUMENTS

2010/0029272 A1* 2/2010 McCann ................. H04W 4/16
455/433
2010/0034375 A1* 2/2010 Davis .................... G06F 21/606
380/42
2011/0195710 A1* 8/2011 Nas ......................... H04W 8/18
455/432.3

* cited by examiner

*Primary Examiner* — Jutai Kao

(57) ABSTRACT

Component for insertion into a cellular communication network to reduce redundant signaling on the network or between the network and other networks, comprises: an extractor, to extract signaling passing the insertion point towards a destination, modify the signaling and reinsert the signaling for sending onwards. The extractor comprises a signal part remover to remove a part determined to be present at the destination; and an inserter for inserting a flag into the signaling to indicate the removal. The modified signal is sent on to the destination where a complementary component reads the flag and reinserts the extracted part from a database of its own. Location update activity often involves redundant transfer of user profiles, which the components herein can save.

13 Claims, 4 Drawing Sheets

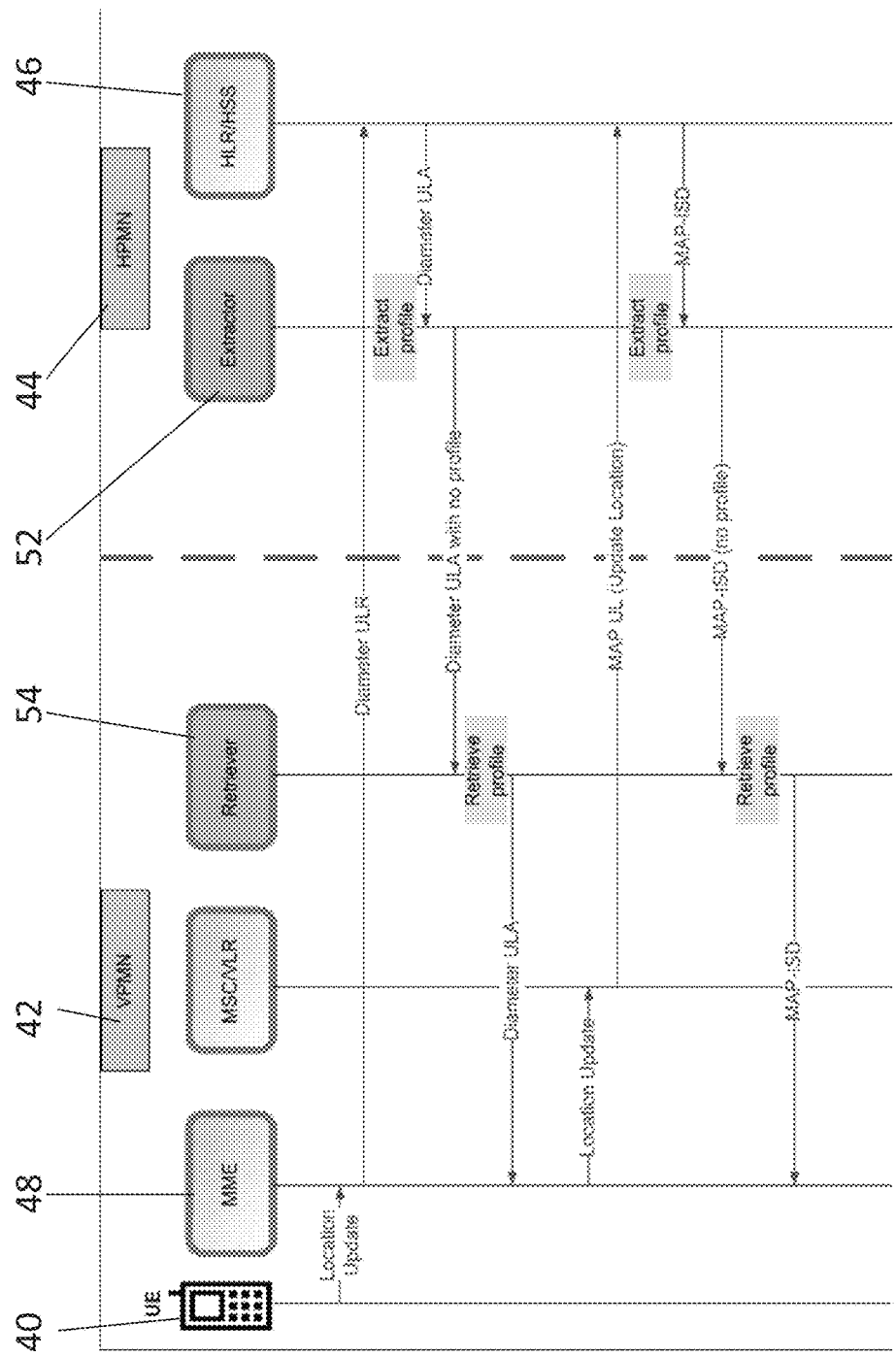

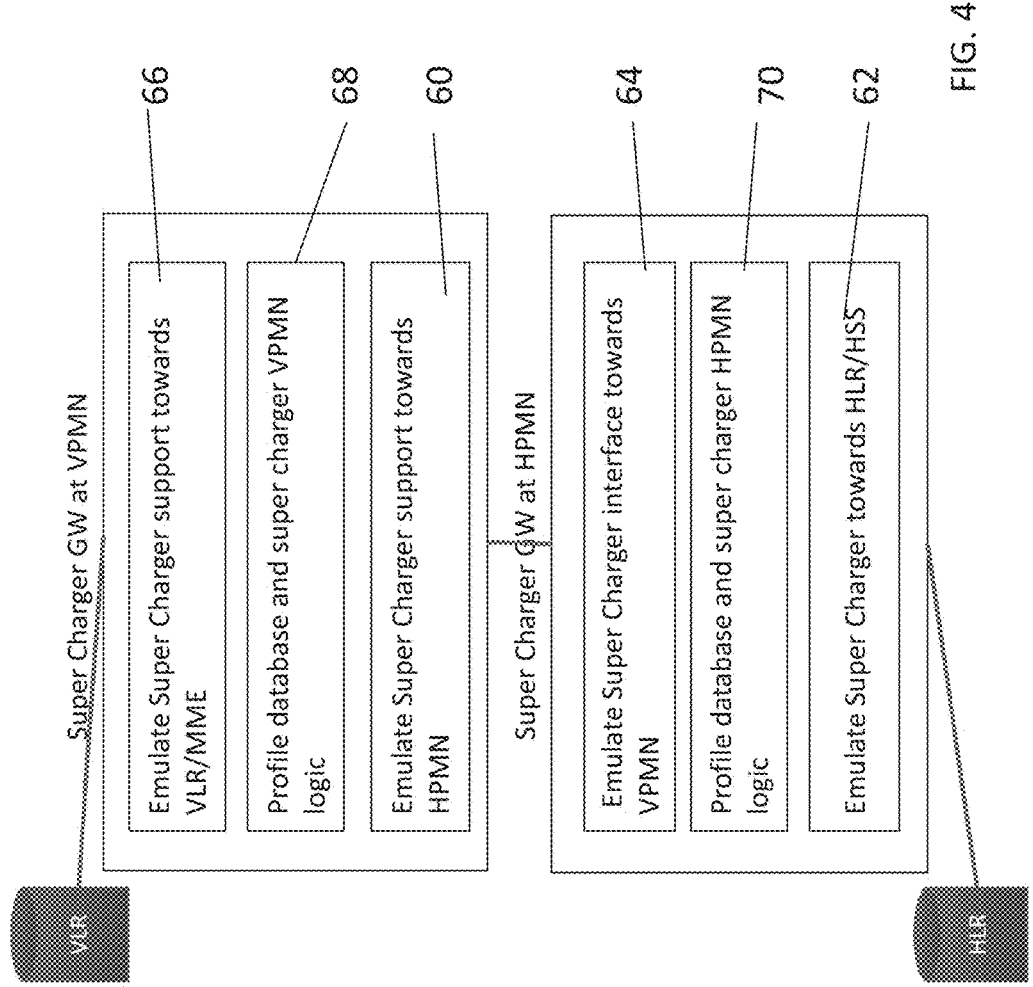

SYSTEM AND METHOD FOR REDUCING MOBILE NETWORK SIGNALING

RELATED APPLICATION

This application claims the benefit of priority under 35 USC §119(e) of U.S. Provisional Patent Application No. 62/018,703 filed Jun. 30, 2014, the contents of which are incorporated herein by reference in their entirety.

FIELD AND BACKGROUND OF THE INVENTION

The present invention, in some embodiments thereof, relates to a system and method for reducing mobile network signaling.

Mobile networks currently undertake a large amount of signaling. By the term signaling is meant all the background and overhead communication beyond the actual calls and data of the users. The increase is related to the increasingly wide distribution of smart phones and smart phone usage which is typified by large scale use of applications, each application having overhead and adding to the total of data. Chat applications for example are based on numerous albeit short but mobile data iterations. The increase in data usage per se increases the signaling that is required to handle the data.

The amount of signaling has risen significantly with the advent of smart phones, and is now set to increase even more with the introduction of the Internet of Things. The Internet of Things generally involves small devices with embedded SIMS, that monitor and occasionally communicate. The devices tend to be imported with SIMs already included, the SIMS being pre-registered, typically in the country of manufacture or another convenient location, but not usually the country of import, and thus spend their lives in permanent roaming, with all the associated overheads, wherein the overheads involve international signaling. In the Internet of Things it is often preferred to use SIMs and the cellular network directly over a local Wifi network since local Wifi may not always be available and even if Wifi is available the device would need to be configured with the local Wifi and potentially cross a local enterprise firewall. In case of moving things, such as vehicles, the amount of signaling is much larger, because of frequent location updates, but for the most part there is very little payload traffic from these devices. In case of roaming all the update locations need to be sent over the International connections to the home network on which the device SIM is registered, and the provider has to pay for the international signaling on the basis of very little revenue. As an example, a large mobile network recently found that 20% of their signaling is from machine-to-machine devices. As the Internet of things grows it becomes more and more necessary to reduce the signaling.

As part of the overhead, data sessions are often initiated with an update location transaction, and this is particularly common if the device is not registered in the serving MME or MSC, or if synchronization has been lost. In 3G signaling, some handsets always initiate a data session with a MAP Update Location procedure. The update locations are, however, just part of the problem.

One of the biggest parts of the update location is the user profile. In roaming use, the profile is sent from the home network to indicate to the roaming network how to handle the user. The ETSI communication standards provide for an optional field in the update location request to indicate that the roaming network already has the profile and therefore it does not need to be sent. The field is used in a method known as the ETSI Supercharger. In the supercharger, a visitor location register (VLR) at the roaming network, retains a user profile once first requested. In subsequent location updates the field is used to indicate to the home network only to send the user profile in the event of a change since the last update. The Home location register, (HLR) is required to keep track of whether the profile has changed since the last send of the profile.

In order to implement the supercharger, changes are required to be made to the VLRs and HLRs (or the 4G MME and the HSS, respectively) and integration is required between the two networks. However, the HLR's and VLR's are difficult and expensive to access, and in particular, there may be numerous VLR's per network each of which would have to be accessed independently. The HLRs and VLRs are furthermore considered as critical elements which cannot be allowed to fail and hence any changes are required to be thoroughly tested. Furthermore VLR capacity is limited—most VLRs were constructed before the days of the smartphone, and additional loading of the VLR, which may run the danger of reducing VLR availability, is not encouraged. That is to say, any addition to a VLR runs the risk of causing a system crash. As a result there has been virtually no uptake of the Supercharger, despite the clear need. In general, it is not recommended for the HLR to carry out all kinds of applications, as it is the most critical element of the mobile network.

SUMMARY OF THE INVENTION

The present embodiments relate principally to carrying out update locations with a reduced amount of data, but may be extended to other kinds of signaling. Gates or servers as add-on components may be inserted into the signaling lines at various networks or strategic points in the networks which have access to the signaling, and then it is possible to work between two components, or between one component and a network that already supports the supercharge standard. As with the supercharger, parts of the signal that are known to be present at the signal destination are extracted from the signal and re-inserted at the destination, but the necessary modifications are made using an add-on component rather than disrupting the critical components of the existing network.

According to an aspect of some embodiments of the present invention there is provided a component for use in association with a cellular communication network to reduce redundant signaling on the network or between the network and other networks, the component comprising:

an extractor configured to extract network signaling that is heading towards a destination, and to reinsert the signaling for sending onwards in reduced form, the extractor comprising;

a signal part remover, configured to remove, from the extracted signaling, at least one part of the signaling determined to be present in association with the destination.

An embodiment may comprise an inserter for inserting a flag into the signaling to indicate the removal, the extractor configured to pass on the signal including the flag and without the extracted parts, towards the destination.

In an embodiment, the signaling is part of an update location response and the at least one part is a user profile.

In an embodiment, the update location request is one member of the group consisting of a MAP update location request and a Diameter update location request.

In an embodiment, the flag is recognized by a cellular communication standard to allow for recognition by a network component that has cellular communication standard compatible signaling reduction.

The component may emulate a home location register that has cellular-communication-standard compatible signaling reduction.

The component may be configured as a signaling server.

The component may comprise a database indicating whether a respective signal part for a respective user has been changed since a previous occasion when the same signal part was sent to the destination, the indicating being used to provide to the signal remover an indication that the signal part is present at the destination.

According to a second aspect of the present invention there is provided a component for use in association with a cellular communication network to reduce redundant signaling on the network or between the network and other networks, comprising:

a retriever configured to extract signaling of the network, which signaling is directed towards a destination, and to modify the signaling for sending onwards, the retriever comprising:

a reduction detector, configured to determine whether the extracted signaling has had a redundant part removed; and a signal part inserter, configured to insert, into the signaling, at least one part of the signaling determined to be the same as the removed part of the signaling, the retriever configured to pass on the signaling with the inserted part, towards the destination, thereby modifying the signaling.

In an embodiment, the reduction detector comprises:

a reader, the reader configured to read a flag in the signaling indicating that a part of the signaling has been removed.

In an embodiment, the signaling is part of an update location response and the at least one part is a user profile.

In an embodiment, the update location request is one member of the group consisting of a MAP update location request and a Diameter update location request.

In an embodiment, the flag is recognized by a cellular communication standard to allow for recognition by a network component that has cellular communication standard compatible signaling reduction.

The component may be configured to emulate a visitor location register that has cellular-communication-standard compatible signaling reduction.

The component may comprise a database containing a respective signal part for a respective user, the part obtained on a previous occasion when the same signal part was sent to the destination, the database being configured to provide the previously obtained signal part to the signaling upon reading of the flag.

According to a third aspect of the present invention there is provided a method of reducing signaling within or between cellular networks comprising:

extracting a signal transferred from a source to a destination;

identifying a part of the signal already held in association with the destination;

removing from the signal the part already held at the destination; and sending the signal without the part onwards to the destination.

The method may comprise inserting a flag into the signal indicating that the part is already held in association with the destination and has been removed prior to the sending.

According to a fourth aspect of the present invention there is provided a method of reducing signaling within or between cellular networks comprising:

extracting a signal transferred from a source to a destination;

identifying that part of the signal already held in association with the destination has been removed;

inserting into the signal the part already removed; and sending the signal with the part onwards to the destination.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is a signaling diagram illustrating the passage of signals involving a location update of a mobile device, where the signaling is modified according to embodiments of the present invention; and FIG. 4 is a chart of flow elements used in an embodiment of the present invention.

Figure 1:
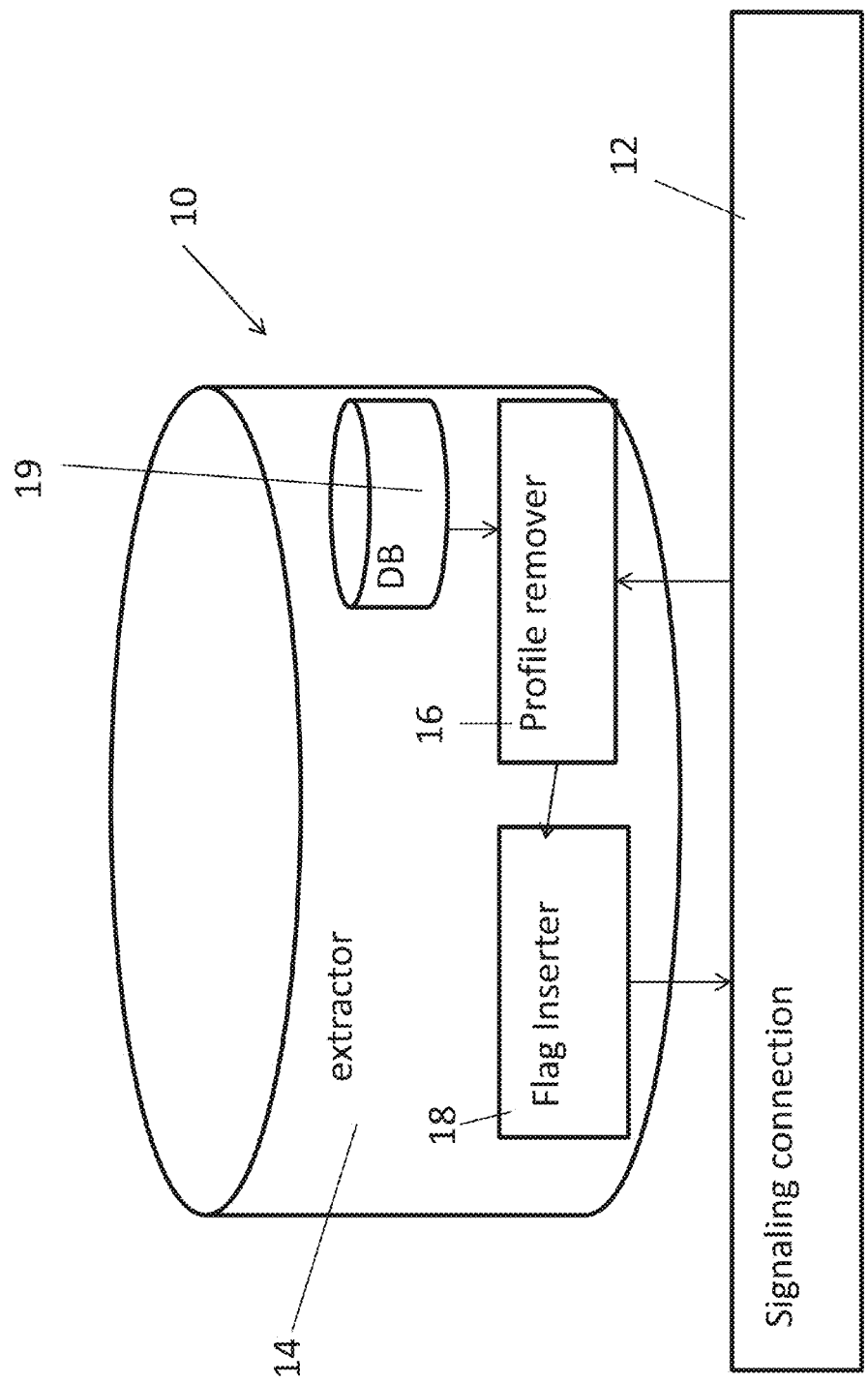
FIG. 1 is a simplified schematic diagram of a signal extractor according to a preferred embodiment of the present invention.

DESCRIPTION OF SPECIFIC EMBODIMENTS
OF THE INVENTION

The present invention, in some embodiments thereof, relates to a system and method for reducing mobile network signaling and, more particularly, but not exclusively, to a system and method for reducing the size of signals such as network update location responses by stopping repeat transmission of unchanged user profiles.

The present embodiments provide two complementary components. A first component is associated with the cellular communication network that contains the home location of the mobile phone. The component may be installed at a point where there is access to signaling as the purpose of the component is to reduce redundant signaling on the network or between the network and other networks. The component hence may be installed at the core network premises, or elsewhere, such as in the cloud, as long as the signaling traffic goes via the cloud. The component comprises an extractor which extracts signaling passing the component towards a destination, and optionally modifies the signaling and reinserts the modified signaling back into the signaling stream for sending onwards. In order to do this, the extractor comprises a signal part remover to remove parts of the signal determined to be present at the destination. Such a signal part may be a user profile, a relatively large part of an update location response but most often unchanged since previous update requests. An inserter may then insert a flag into the signaling to indicate the removal. The signal is then sent on to the destination where the second, complementary component reads the flag or identifies an absence of a profile (or of another piece of information) and reinserts the extracted part from a database of its own. The destination may be on a geographically separate part of the first network or may be on another network.

If either one of the networks already uses the supercharger modification, then the components of the present embodiments are able to work with the supercharger. The supercharger can be supported by the home network, or the visited network. In either of these cases, the components of the present embodiments emulate the supercharger support at the side lacking native support.

Signaling refers to exchange of information between the home and visited network, regarding the roaming subscribers and the working relations within a network or between the networks. Typically, signaling is carried via the MAP (Mobile Application Part) SS7 protocol, or in the case of a fourth generation (4G) or LTE network via Diameter, or GTP (GPRS Tunneling Protocol), or other suitable protocols between wireless networks. As a particular case, the signaling may include the download of the roaming subscriber protocol and activation from the home network to the visited network.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates an add-on component 10 installed in a cellular communication network to reduce redundant signaling on the network or between the network and other networks The component is connected to the network signaling infrastructure, which can be an STP (Signaling Transfer Point), a DRA (Diameter Relay Agent) or any signaling router—12. The component may be inserted into the network, or in association with the network, or even in the cloud, as long as the component has access to the signaling. If the signaling is between two networks then the component is installed where all signaling traffic exiting the network passes. If the signaling is between two geographically separated portions of the same network then the component is installed where all signaling leaving for the separated portion passes.

The add-on component includes extractor 14, which extracts relevant information from the signaling stream towards a destination. The signaling is modified by means of the extraction and additionally if there is a need, as will be explained in greater detail below, and then the modified signal is reinserted for sending onwards.

Extractor 14 comprises a signal part remover 16, which removes one or more parts of the signaling which are determined to be present in association with the destination. That is to say, a part of the signal may be of the nature of a user profile or like piece of information that is unlikely to have changed between each update location request. If it can be determined that the signal part has in fact not changed since the last update and that the particular signal part is therefore held by the destination, then the signal part can be removed. How this determination is made is discussed in greater detail hereinbelow. In the figure the signal part remover is denoted as a profile remover as the user profile is a particularly strong candidate for removal.

Flag inserter 18 may insert a flag into the signaling to indicate that a part of the signal has been removed. The extractor configured to pass on said signal including said flag and without said extracted parts, towards said destination.

As discussed, the signaling may for example be a part of an update location request, and the part of the signal that is a candidate for removal may be a user profile. The user profile may comprise several part profiles, and one or more of the part profiles may be removed. Depending on the network protocol in use, the update location request may be a MAP update location request or a Diameter update location request or any other type of protocol-specific request. The profile, in this case, is part of the MAP ISD (Insert Subscriber Data) response, or the Diameter ULA (Update Location Answer).

The flag may be compliant with a cellular communication standard such as the ETSI supercharger so that other standard compatible solutions may work together with the extractor of the present embodiments. Thus the flag may be recognized by any network component that has cellular communication standard compatible signaling reduction.

The add-on component of the present embodiments may emulate a home location register that has cellular-communication-standard compatible signaling reduction, so that the add-on component appears to external components to be such a register carrying out signal reduction.

The add-on component may be installed at a cellular network as a signaling server, or can be installed elsewhere, such in the cloud or at the international signaling carrier connecting mobile networks, where the signaling traffic between mobile networks is managed.

The add-on component may further comprise a database 19. The database indicates whether the profile or other signal part being removed has been changed since a previous occasion when the same signal part was sent to the same destination. That is to say the database has entries for the given user and the given destination. The database entry may be used to provide an indication that the signal part or parts, typically the user profile, is present at the destination and can safely be removed. The database can manage the destination not only at the network level, but on the VLR level (for 3G networks) or the MME level (for 4G networks).

Figure 2:
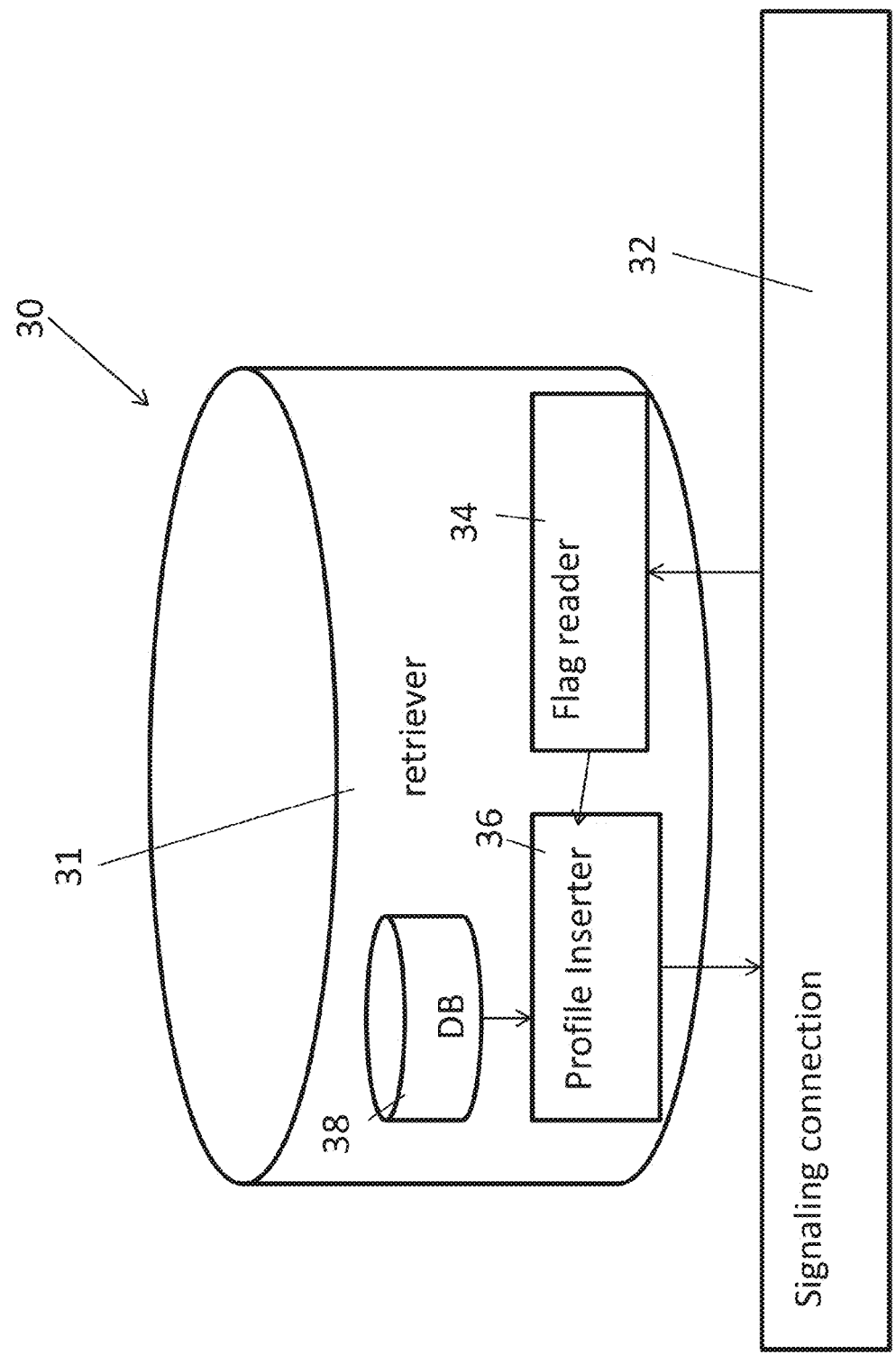
FIG. 2 is a simplified schematic diagram of a signal retriever according to a preferred embodiment of the present invention.

Reference is now made to FIG. 2, which is a simplified schematic diagram showing a second add-on component to be associated with the destination cellular communication network. This second component is for the network or network part receiving the signal, which in the case of a location update response would be the actual network at which the cellular telephone is located.

The add-on component 30 comprises a retriever 31 which retrieves signaling information, while the signaling passes the component towards a destination. The component is connected to signaling connection 32 having access to all relevant signaling entering the particular network or network part.

The retriever may include a flag reader 34 which checks for or reads the flag set by the extractor. The flag may indicate that a part of the signaling was removed by the extractor and is available on the local network. If the flag is found then the signal part inserter 36, or profile inserter, obtains from database 38 the missing signal part and inserts or replaces it back into the signal. The signal with the replacement is now sent on to the final destination. Alternatively, the retriever may identify that part of the signaling was removed at the source network, simply based on the lack of information. For example the retriever may directly determine that the profile is missing.

The signaling may typically be part of an update location response and the part removed and reinserted may include the user profile.

The response may be a MAP update location response or a Diameter update location response or any other form of the request in accordance with the protocol being used on the network.

The add-on component may emulate a VLR (visitor location register) or MME (Mobility Management Entity) or a like component, as appropriate for the protocol in use, that has supercharging, meaning that uses a cellular-communication-standard compatible signaling reduction.

Database 38 retains signal parts from passing signaling so that they can be reused following repeat signals from the same user. In particular database 38 may copy user profiles from passing update location responses, to store together with identification of the user so that future update location responses can have the profiles removed.

Reference is now made to FIG. 3, which is a simplified signaling diagram showing the passage of a location update request between two networks according to an embodiment of the present invention. The top half of the figure shows a location update according to the diameter protocol for 4G/LTE. The lower half of the figure shows the request according to the MAP protocol used by 3G and GSM networks. The combined system provides 4G operation with fallback compatibility to operate with 3G networks.

The mobile device 40 is located at visited network VPMN 42 and sends an update location request to the home network 44 at which the user is registered and particularly to the home register HLR or HSS 46. The update location request ULR is made by mobile device 40 and sent to VPM 42 and MME 48. The MME sends the request to the HLR/HSS, all using the Diameter protocol. The HSS 46 then sends an update location answer ULA via extractor 52 which checks whether the profile already exists at the VPMN. If the profile exists at the VPMN, because the profile has not been updated since the last update location to the same VPMN, then the profile is extracted, and the signal is sent on with the profile missing, but optionally with a flag added.

The signal then reaches the retriever 54 which reads the flag and searches for and adds back the missing profile. The restored ULA is then sent on to the MME to complete the location update procedure.

In the equivalent MAP procedure, the mobile device 40 is likewise located at visited network VPMN 42 and sends an update location request to the home network 44 at which the user is registered and particularly to the home register HLR 46. The location update request is made via MSC/VLR 50. The MSC/VLR 50, then sends a MAP UL on to the HLR 46. The HLR 46 then sends an update location answer MAP ISD via extractor 52 which checks whether the profile already exists at the VPMN. If the profile exists at the VPMN, because the profile has not been updated since the last update location to the same VPMN, then the profile is extracted, and the signal is sent on with the profile missing, but with a flag added.

The signal then reaches the retriever 54 which reads the flag and searches for and adds back the missing profile, completing the location update procedure.

The present embodiments are now considered in greater detail. The embodiments comprise two separate elements, the Extractor and the Retriever. The extractor is a mobile signaling server that is able to extract repetitive information from signaling messages on one network location, while the Retriever is a mobile signaling server that is able to retrieve the extracted information and place it back in the signaling message, in another network location. Hence, the transfer of redundant information between the two locations may be eliminated.

Note that the two components are separate entities that may reside in different mobile networks, or in different parts of the same network, and may be provided by different vendors but are complementary.

The invention may relate to 3G networks, to 4G and LTE networks and to further developments of the cellular network system.

One use case for the present embodiments can be found in the mobile update location response message. When a VLR (in a 3G network) or an MME (in 4G/LTE) issues an Update Location message towards the HLR or HSS, then what has been issued is a message for a specific subscriber trying to register to the network MSC/MME, or for the same subscriber to update its location. The HLR/HSS confirms the request by sending the subscriber profile. The profile contains many parameters and fields of information. In an average network, the update location request/response takes place typically 8-10 times per day. However, in something approaching 100% of the cases, the profile remains the same and does not change between the update locations. Thus the same profile may be downloaded again and again to the same VLR/MME. In fact, in most of the cases the same profile is downloaded multiple times to all VLRs/MMEs serving the subscriber during the roaming visit. Usually the roamer, being out of his/her home country and therefore not in direct contact with the provider, is quite unlikely to make changes to the parameters of the account. The only changes are likely to be enabling or disabling of specific roaming services. Such changes typically happen once or maybe twice per roaming episode and yet are downloaded to the same VLRs/MSCs several times per day.

The present embodiments thus make use of or provide two signaling servers, referred to herein as the extractor and the retriever. Both servers may be located on the signaling path between the MSC/VLR and HLR (in 3G) or MME and HSS (in 4G), or similar equipment in other wireless networks. The extractor is located closer to the HLR/HSS, for example in the home network (HPMN) of a roaming subscriber in the case of roaming, or in an IPX serving the home network. The retriever is located at the visited network serving the roaming subscriber for example, or in an IPX serving the visited network.

As discussed above, the present embodiments are not specifically related to roaming, and both the extractor and the retriever may be located within the same mobile network, saving signaling between the core network elements. They are particularly useful for networks covering a fragmented geographical distribution.

In the following the roaming case is used for describing the present embodiments.

The extractor server 10 can be a MAP signaling relay, a Diameter Routing Agent, which monitors the Update Location responses going from the HPMN to the VPMN. The extractor server 10 also manages a database 19 of profiles or roaming subscribers. The extractor 10 intercepts an Update Location reply, which may be a MAP ISD or the equivalent Diameter message or any other relevant message, and compares the subscriber profile provided in the message with the latest profile stored in its database 19 for the given subscriber, for the given destination. A relevant destination may be associated with a specific retriever server 20. If the retriever server associated with the current destination already has the specific subscriber profile, then the profile can be removed from the signaling message and replaced with an indication that the profile has been removed.

The retriever 20, on the other hand, intercepts the same message, and if the "profile removed" indication is included, it fetches the latest profile for the given subscriber from its internal database 38, and inserts it back into the message. Hence the retriever 20 also manages a database 38 of removed profiles. Operation of the preferred embodiments is now described in relation to FIG. 4.

Module 60 indicates emulating Super Charger support towards the HPMN.

The idea is to use the network signaling messages as an internal information transport between network platforms with data quantity reduction where possible.

Within module 60 comes GSM/3G registration.

GSM/3G registration involves decoding the Update Location destination at the VPMN, which in turn involves decoding the MAP message parameters, and extracting a destination address.

At this point the home network, or HPMN, is identified so the next task is to determine if the super charger is supported by the HPMN.

The Supercharger is either naturally supported by the HPMN or is artificially supported via the present embodiments.

A database is built up of all HPMNs and their supercharging support status.

Where there is support for supercharging then a super charger indication may be added to the Location Update message. In order to make such an addition it is necessary to add fields to a MAP message, or change the size of an existing field and possibly make changes to other related fields.

The message for sending via the signaling Proxy is encoded.

An alternative is to handle LTE registrations.

LTE registrations are handled in the same way as 3G or GSM registrations, however they are implemented in the Diameter IP-based environment.

Module 62 relates to emulating a Super Charger support towards the HLR/HSS (in HPMN).

The emulation may involve support for GSM/3G MAP, and such support may involve decoding MAP Update Location messages.

Following decoding, parameters may be extracted and a determination is made as to whether the message contains a "super charger" request.

If super charging is requested and the HLR supports a "super charger" function then the message is relayed as is.

If super charging is requested but the HLR does not support supercharging then the indication is removed from the message, decoded and sent back to the MAP Relay.

The above is followed by intercepting the Update Location response, which includes the user profile (ISD).

The system may emulate VLR/MME responses towards the HLR/HSS and get all the parts of the existing ISD. The profile may be built up from partial messages.

The next stage is to check if the profile already exists in the profile database. If the profile does not exist then it may be inserted in the profile database. The system then checks if the profile has been updated, which may require a matching of all parameters. If the profile has been updated, then it may be updated in the database.

An alternative is to support LTE Diameter.

For LTE, the equivalent function is carried out but however implemented in the Diameter IP-based environment.

Module 64 relates to emulating a Super Charger interface towards VPMN (in HPMN).

A first stage involves sending a profile to VPMN (2G/3G).

In module 64, a first requirement is to check whether the profile which is the subject of the signaling has been updated since the last time it was sent to the VPMN, and requires tracking the same profile per VPMN.

In the case of an update there is a need to change all parameters, so if the profile has been updated then it is necessary to send the new profile in the ISD response, as would have been done without the Super Charger.

If, on the other hand, the profile has been sent already and there have been no changes then an UL response without the profile is sent, and the super charger indication is used instead. The super charger indication, the flag as referred to above, may be the indicator supported by the standard, so as to cater for the case where the VPMN directly supports the super charger.

Part of the update location procedure involves sending a MAP cancel to the previous network if the user has moved networks. The update location procedure determines if there is a need to send a CANCEL to the previous network, in the usual way and sends the message as necessary.

The profile may also need to be sent to the VPMN under 4G/LTE.

In the case of LTE, the task is carried out in a similar way, however implemented in the Diameter IP-based environment.

Module 66: Emulating a NON-Super Charger interface towards VLR/MME (in VPMN).

The role of module 66 is to emulate a Super Charger towards the VLR or an MME.

Emulating may involve obtaining the HLR response to the update location message. The task requires acting as an MSC at the VPMN side and supporting the MAP messages and interfaces.

If there is a Super Charger indication & the VPMN supports super charging then the message is relayed to the VLR as is. No action is required. If on the other hand there is a Super Charger indication but the VPMN does not support super charging then it is necessary to fetch the latest profile from the database, add the profile into the ISD response, and emulate the HLR by sending the profile to the VLR.

The emulation may require the generation of a complete session with multiple messages being passed between the emulated HLR and the VLR, instead of a single message coming from the real HLR.

An alternative of module 66 involves_emulating a Super Charger towards MME.

As before, a similar function is implemented in the Diameter IP-based environment. In the Diameter case there is no need for a multi-message session, since the profile is one piece.

Module 68 relates to profile database management at the VPMN. First of all, there may be a need for periodic removal of subscribers. One part of database management is to identify inactive subscribers, based for example on a configurable timer. A batch mechanism may be provided for removal of the inactive subscribers whose profiles have not been used in the time period specified.

Real-time removal of subscribers is an alternative or additional method of database management whose task is to identify and remove the oldest or inactive subscribers in the case of the database being full.

In this case an indication is received that the database is full. Configurable thresholds may be used to define a database as being full.

Purging of subscribers may be carried out as a result of HLR/HSS error, and managing of the HLR/HSS errors are generally handled by MAP or Diameter as appropriate.

It may be necessary to check that there is no active session before removal of the old or inactive subscribers, and the check may involves a query to the VLR/MME using MAP or Diameter as appropriate. The check may involve PSI (Provide Subscriber Information)—in MAP, and IDR (Insert-Subscriber-Data-Request)—in Diameter.

It may then be necessary to notify the HPMN.

The HLR/HSS is required to be notified after a purge—this is mandatory since the HPMN needs to know that the VPMN does not have the current profile. The notification is made using MAP or Diameter as appropriate.

Module 70 relates to a profile database and the super charger, with HPMN logic.

Support VPMN Notifications

In order to provide the system at the home network it may be necessary to provide support for new MAP/Diameter commands such as "Check Reason in Serving Network" messages.

It may further be necessary to manage MAP or Diameter errors and conditions. It may be necessary to support mandatory/optional parameters per network.

Manage HPMN Database (DB)

It may be necessary at times to implement a data purge in the internal HPMN database. On purging, it may be necessary to update the status regarding the purged user profiles per VPMN so that the home networks do not mistakenly believe that the profiles are still present at the VPMN.

Purging may involve deleting inactive subscribers according accumulated information over all VPMNs, and if this is done then there is a need to check if the subscriber was active in any of the VPMNs.

It is expected that during the life of a patent maturing from this application additional generations of cellular technology will be developed and all references to cellular technology are intended to include all such new generations a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Component for use in association with a cellular communication network to reduce redundant signaling on the network or between the network and other networks, the component comprising:

an extractor configured to extract network signaling that is heading towards a destination, and to reinsert said signaling for sending onwards in reduced form, said extractor comprising a signal part remover, configured to remove, from said extracted signaling, at least one part of said signaling determined to be present in association with said destination;

an inserter for inserting a flag into the signaling to indicate the removal, said extractor configured to pass on said signaling including said flag and without said extracted parts, towards said destination;

wherein said signaling is part of an update location response and said at least one part is a user profile.

2. The component of claim 1, wherein the update location request is one member of the group consisting of a MAP update location request and a Diameter update location request.

3. The component of claim 1, wherein the flag is recognized by a cellular communication standard to allow for recognition by a network component that has cellular communication standard compatible signaling reduction.

4. The component of claim 1, configured to emulate a home location register that has cellular-communication-standard compatible signaling reduction.

5. The component of claim 1, configured as a signaling server.

6. The component of claim 1, further comprising a database indicating whether a respective signal part for a respective user has been changed since a previous occasion when the same signal part was sent to said destination, said indicating being used to provide to said signal remover an indication that said signal part is present at said destination.

7. Component for use in association with a cellular communication network to reduce redundant signaling on the network or between the network and other networks, comprising:
a retriever configured to extract signaling of said network which said signaling is directed towards a destination, and to modify said signaling for sending onwards, said retriever comprising:
a reduction detector, configured to determine whether said extracted signaling has had a redundant part removed; and
a signal part inserter, configured to insert, into said signaling, at least one part of said signaling determined to be the same as said removed part of said signaling, the retriever configured to pass on said signaling with said inserted part, towards said destination, thereby modifying said signaling;
wherein said reduction detector comprises a reader, the reader configured to read a flag in said signaling indicating that a part of said signaling has been removed;
wherein said signaling is part of an update location response and said at least one part is a user profile.

8. The component of claim 7, wherein the update location request is one member of the group consisting of a MAP update location request and a Diameter update location request.

9. The component of claim 7, wherein the flag is recognized by a cellular communication standard to allow for recognition by a network component that has cellular communication standard compatible signaling reduction.

10. The component of claim 7, configured to emulate a visitor location register that has cellular-communication-standard compatible signaling reduction.

11. The component of claim 7, further comprising a database containing a respective signal part for a respective user, the part obtained on a previous occasion when the same signal part was sent to said destination, the database being configured to provide said previously obtained signal part to said signaling upon reading of said flag.

12. A method of reducing signaling within or between cellular networks comprising:
extracting a signal transferred from a source to a destination;
identifying a part of said signal already held in association with said destination;
removing from said signal said part already held at said destination;
inserting a flag into said signal indicating that said part is already held in association with said destination and has been removed; and
sending said signal without said part onwards to said destination;
wherein said signaling is part of an update location response and said part is a user profile.

13. A method of reducing signaling within or between cellular networks comprising:
extracting a signal transferred form a source to a destination;
identifying that part of said signal already held in association with said destination has been removed by detecting a flag placed within said signal;
inserting into said signal said part already removed; and
sending said signal with said part onwards to said destination;
wherein said signaling is part of an update location response and said part is a user profile.

* * * * *